W. T. DE WORTH.
HOSE COUPLING.
APPLICATION FILED SEPT. 7, 1906.
902,806.
Patented Nov. 3, 1908.
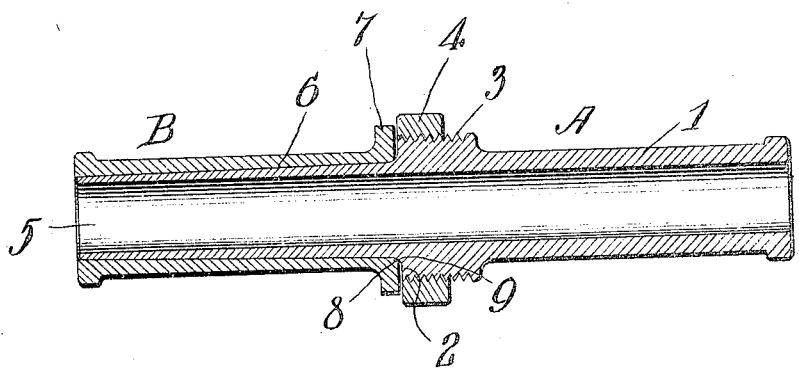
WITNESSES:
William T. De Worth
INVENTOR.
By Chrow Co.
ATTORNEYS

UNITED STATES PATENT OFFICE.

WILLIAM T. DE WORTH, OF BORDENTOWN, NEW JERSEY.

HOSE-COUPLING.

No. 902,806.      Specification of Letters Patent.      Patented Nov. 3, 1908.

Application filed September 7, 1906. Serial No. 333,679.

*To all whom it may concern:*

Be it known that I, WILLIAM T. DE WORTH, a citizen of the United States, residing at Bordentown, in the county of Burlington and State of New Jersey, have invented a new and useful Hose-Coupling, of which the following is a specification.

This invention relates to couplings and is more particularly adapted for use in connecting hose such as used in apparatus utilizing compressed air, steam, etc., as motive power.

The object of the invention is to provide a simple and durable coupling which is inexpensive in construction and can be easily put together or disconnected.

A still further object is to provide a coupling which can not be easily broken, is capable of resisting heavy tortional strains, and which is perfectly rigid at all times.

With the above and other objects in view the invention consists of certain novel features of construction and combinations of parts which will be hereinafter more fully described and pointed out in the claim.

In the accompanying drawing, which is a section through the coupling, I have shown the preferred form of the invention.

Referring to the drawing by characters of reference, A and B are the two members of the coupling the member A being provided with a tubular cylindrical portion 1 having an annular shoulder 2 provided with screw threads 3 engaged by a nut 4. Extending from the shouldered end of the cylindrical portion 1 is a tapered tubular extension 5 the bore of which constitutes a continuation of the bore within the cylindrical portion 1.

The member B has a gradually tapered bore 6 corresponding with the taper of the extension 5 and an annular flange 7 is formed at one end of this member B. The large end of the bore 6 is preferably slidably flared as at 8 to correspond with a small enlargement 9 formed at the large end of the extension 5.

The cylindrical portion 1 is adapted to be suitably secured to one section of a hose while the member B is adapted to be secured to the other section thereof. When it is desired to couple the hose sections the member B is forced longitudinally upon the extension 5 and the enlargement 9 becomes seated within the flared end 8 of the bore 6. The two portions are thus held together by frictional contact and can not be forced apart unless unusual pressure is exerted upon them. When it is desired to uncouple the members the nut 4 is rotated by means of any suitable tool and bears against the flange 7 and exerts a longitudinal and rotary pressure thereagainst sufficient to force the two members apart. It will be seen that a coupling of this nature is very simple in construction in that it is formed of but three parts and is capable of resisting severe strains both tortional and longitudinal.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the claim.

What is claimed is:

A coupling comprising a tubular member having an intermediate externally threaded annular shoulder extending around the entire circumference thereof and provided with a smooth continuous interior bore of the same cross sectional diameter throughout its entire length, the exterior walls of said member on one side of the shoulder being tapered towards the adjacent end of the member, and the exterior walls of the member on the opposite side of the shoulder being of uniform thickness and adapted to engage a tube to be coupled, a correspondingly internally tapered tubular member arranged to receive the tapered portion of the first mentioned member and to frictionally engage the same throughout its length, said receiving member having a circumferential flange upon one end thereof and adapted to bear against the project beyond the annular shoulder, and a nut engaging the threads upon the shoulder and disposed to bear against the flange to shift the receiving member longitudinally.

In testimony that I claim the foregoing as my own, I have hereto affixed my signature in the presence of two witnesses.

WILLIAM T. DE WORTH.

Witnesses:
     JOHN F. KEATING,
     HOWARD T. JARRETT.